United States Patent [19]

Wooding

[11] 4,354,346
[45] Oct. 19, 1982

[54] INTAKE DUCTS FOR AIRCRAFT JET PROPULSION PLANT

[75] Inventor: Michael S. Wooding, Lytham St. Annes, England

[73] Assignee: British Aerospace, Weybridge, England

[21] Appl. No.: 142,819

[22] Filed: Apr. 22, 1980

[30] Foreign Application Priority Data

May 24, 1979 [GB] United Kingdom ............... 7918191

[51] Int. Cl.³ ............................................. F02C 7/05
[52] U.S. Cl. ................................. 60/39.09 P; 55/306
[58] Field of Search .............. 60/39.09 P; 415/121 G; 55/306; 244/53 B

[56] References Cited

U.S. PATENT DOCUMENTS

| 3,333,794 | 8/1967 | Lewis | 55/306 |
| 3,426,981 | 2/1969 | Allcock | 60/39.09 P |
| 3,871,844 | 3/1975 | Calvin | 60/39.09 P |

Primary Examiner—Louis J. Casaregola
Attorney, Agent, or Firm—Cushman, Darby & Cushman

[57] ABSTRACT

An intake duct (1) for an aircraft jet propulsion engine (2) has a surface region (4) on which a bird travelling along the duct will impact before being ingested by the engine. To minimize damage to the engine, the surface region (4) is formed such that part of the bird is retarded relatively to the remainder, the resultant distortion effecting extravasation and evisceration which produces bird debris of a sufficiently low density to be safely ingested by the engine.

3 Claims, 3 Drawing Figures

U.S. Patent  Oct. 19, 1982  4,354,346
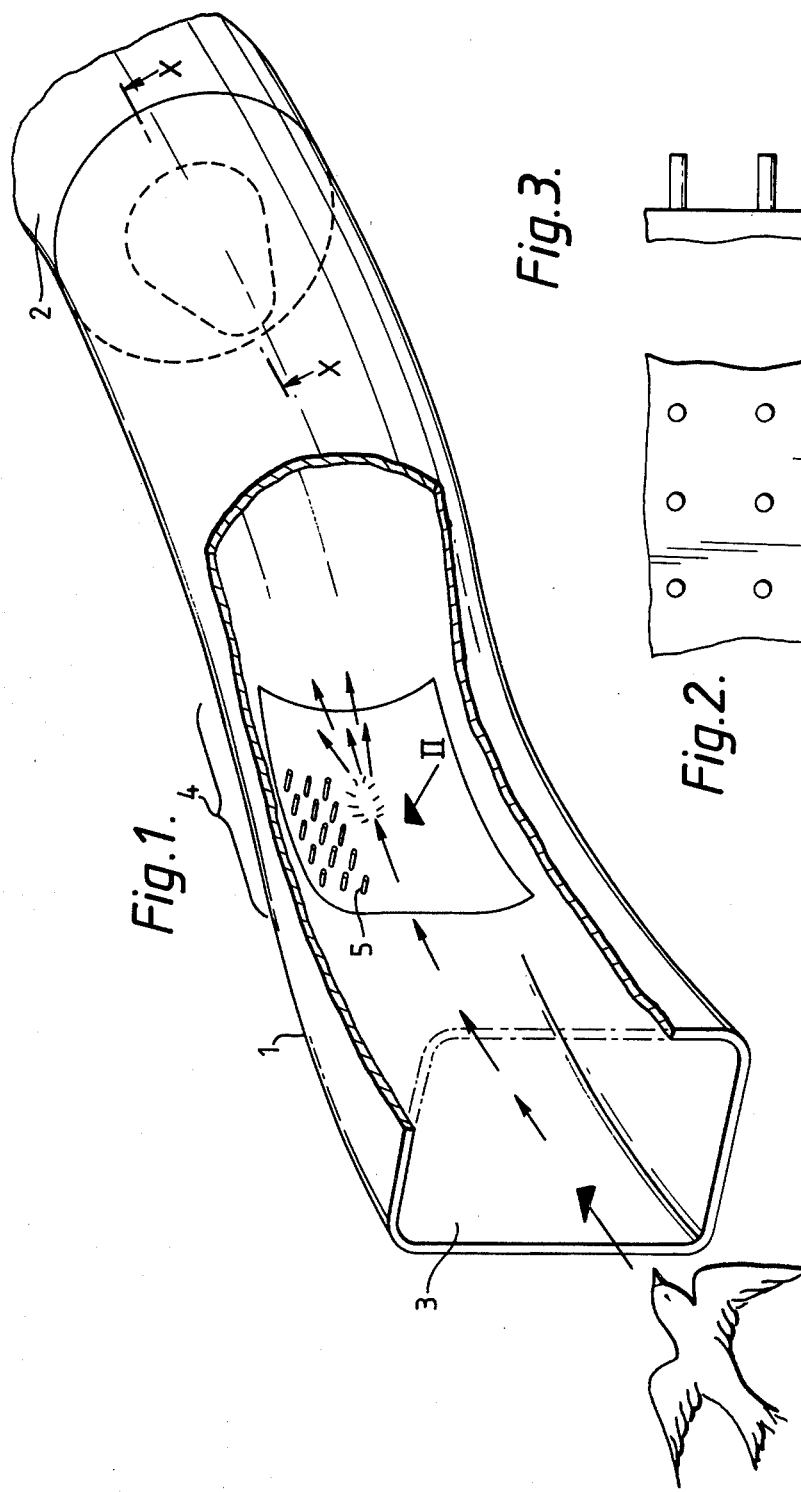
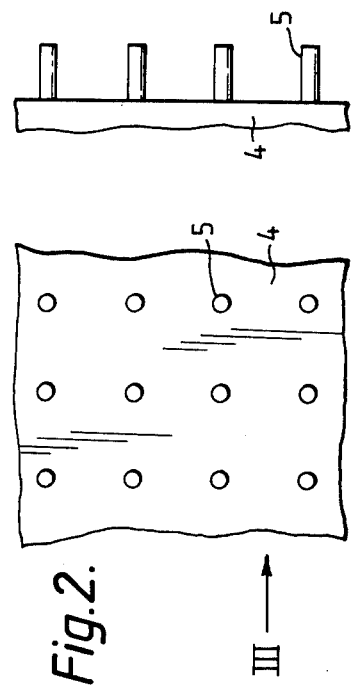

INTAKE DUCTS FOR AIRCRAFT JET PROPULSION PLANT

This invention relates to intake ducts for aircraft jet propulsion plant which are arranged to at least reduce the damage to such plant resulting from birds entering the ducts and subsequently being ingested.

It is difficult or impossible to prevent birds entering intake ducts; accordingly, an objective of the present invention is to condition any bird entering the duct such that it can, in the majority of cases, be safely inspected by the propulsion plant. Naturally in approaching this objective, neither the susceptibility of the ducts to ice accretion, nor the possibility of damaged duct portions entering the power plant should be significantly increased. Similarly, the performance of an engine aspirated by the duct should not be significantly affected.

According to one aspect of the present invention, an intake duct for aircraft jet propulsion plant includes a surface region on which a bird travelling along the duct will impact, a multiplicity of impalement members fixed at that surface region, each member being of such dimensions and so disposed relatively to the other impalement members that part of an impacting bird is impaled thereon and retarded relatively to the remainder of the bird, which remainder is allowed to continue its travel, whereby the resultant distortion produces bird debris of a lower density than the pre-impact bird for ingestion by the jet propulsion plant.

According to a further aspect of the present invention a method of at least reducing ingestion damage to aircraft jet propulsion power plant resulting from birds entering an air intake duct includes the steps of causing a bird travelling along a duct to impact upon a region of the duct, retarding part of the bird relatively to the remainder, and allowing the remainder of the bird to continue its travel whereby the resultant distortion produces bird debris of a lower density than the pre-impact bird for ingestion by the power plant.

One preferred embodiment of an intake duct according to the invention is described with reference to the accompanying drawings, in which:

FIG. 1 is a diagrammatic perspective view of an intake duct for aircraft jet propulsion plant, a portion of the duct being cut away for clarity, FIG. 2 is a plan view of a portion of an impact region, that is to say, a view upon Arrow II of FIG. 1, and, FIG. 3 is a view upon Arrow III of FIG. 2.

Referring to the Figures, an intake duct 1 for an aircraft jet propulsion engine 2 has a forwardly facing mouth 3 offset from the engine axis of rotation X—X. The offset can be horizontal (as drawn), vertical, or a combination of the two depending upon the location of the engine 2 in an airframe. Irrespectively, the duct is therefore of S-shape. It has an oblique surface, shown generally at 4, lying behind the mouth 3 upon which a bird entering the mouth and travelling along the duct 1 will impact before continuing on its way and being ingested by the engine 2. Such ingestment can, and often does, cause sufficient damage to the engine to cause it to fall catastrophically or to necessarily be shut down.

To at least reduce, and to actually prevent in the majority of cases, this engine damage, the impact region 4 of the duct is formed with a multiplicity of impalement members 5 fixed to, and protruding from the duct wall, or, alternatively, a plate member fixed to the duct wall. The impalement members are each in the form of a cylindrical rod, being about ½ inch (13 mm.) in protruding length; about ⅛ inch (3 mm.) in diameter. The rods are disposed with their centres about ¾ inch (19 mm.) apart, as illustrated in FIGS. 2 and 3.

It is found that a bird of 0.68 kg. at a nominal speed of 175 knots impacting upon an oblique impact region set between 10° and 25° to the initial bird trajectory, and including impalement members 5 produced bird debris which could be ingested by the engine without significant damage. This is achieved by firstly impaling a minor part of the bird upon the impalement members 5 so that the impaled part is retarded with respect to the remainder of the bird. The resultant distortion is found to cause extravasation and evisceration which provides bird debris of a low enough density to be ingested by the jet engine without substantial harm.

I claim:

1. An intake duct for aircraft jet propulsion plant, including a surface region on which a bird travelling along the duct will impact, a multiplicity of impalement members of rod-like form fixed at that surface region, each member being of such dimensions and so disposed relatively to the other impalement members that a minor part of an impacting bird is impaled thereon and retarded relatively to the remainder of the bird, which remainder is allowed to continue its travel, whereby the resultant distortion produces bird debris of a lower density than the pre-impact bird for ingestion by the jet propulsion plant.

2. An intake duct according to claim 1 wherein the impalement members are of the order of ½ inch (13 mm.) in length, of the order of ⅛ inch (3 mm.) in width, and are disposed with their centres of the order of ¾ inch (19 mm.) from the centres of the next adjacent members.

3. An intake duct according to claim 2 in which the impalement members are cylindrical.

* * * * *